(12) United States Patent
Morozov et al.

(10) Patent No.: US 9,690,449 B2
(45) Date of Patent: Jun. 27, 2017

(54) TOUCH BASED SELECTION OF GRAPHICAL ELEMENTS

(71) Applicant: Microsoft Corporation, Redmond, WA (US)

(72) Inventors: Vladimir Y. Morozov, Sammamish, WA (US); Fabian O. Winternitz, Kirkland, WA (US); Craig Allen Lee, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 718 days.

(21) Appl. No.: 13/668,196

(22) Filed: Nov. 2, 2012

(65) Prior Publication Data

US 2014/0129985 A1 May 8, 2014

(51) Int. Cl.
*G06F 3/0482* (2013.01)
*G06F 3/0488* (2013.01)

(52) U.S. Cl.
CPC .......... *G06F 3/0482* (2013.01); *G06F 3/0488* (2013.01); *G06F 2203/04805* (2013.01); *G06F 2203/04806* (2013.01)

(58) Field of Classification Search
CPC ..... G06F 2203/4805; G06F 2203/4806; G06F 3/0482; G06F 3/0488
See application file for complete search history.

(56) References Cited

U.S. PATENT DOCUMENTS 7,769,492 B2   8/2010  Wang et al.
8,335,993 B1 * 12/2012  Tan ..................... G06F 3/04886
                                                        715/773

(Continued)

FOREIGN PATENT DOCUMENTS

WO           00/75766 A1   12/2000
WO   WO 0075766 A1 * 12/2000

OTHER PUBLICATIONS

"International Search Report & Written Opinion for PCT Patent Application No. PCT/US2013/068155", Mailed Date: Mar. 28, 2014, Filed Date: Nov. 1, 2013, 13 Pages.

(Continued)

*Primary Examiner* — William Bashore
*Assistant Examiner* — Daniel Parcher
(74) *Attorney, Agent, or Firm* — Dodd Law Group; Michael B. Dodd

(57) ABSTRACT

The present invention extends to methods, systems, and computer program products for touch based selection of graphical elements. Embodiments of the invention improve the usability of interacting with data visualizations. When multiple graphical elements are covered by a finger touch, a gesture recognition component detects ambiguity in the selection. In response, a visualization component draws additional regions around the touched location. The additional regions correspond to the covered graphical elements covered. Thus, a user is made aware of the graphical elements covered by his or her finger. These additional regions are touch friendly and more easily selectable. A finger can be moved into one of the additional regions and released to finish the selection. The gesture recognition component interprets this gesture as if the user tapped directly and unambiguously on the corresponding graphical element.

18 Claims, 10 Drawing Sheets

(56) References Cited

U.S. PATENT DOCUMENTS

| | | | |
|---|---|---|---|
| 2002/0109728 A1* | 8/2002 | Tiongson | G06F 3/04855 715/786 |
| 2006/0053387 A1* | 3/2006 | Ording | G06F 3/04883 715/773 |
| 2006/0161846 A1 | 7/2006 | Van Leeuwen | |
| 2009/0064047 A1 | 3/2009 | Shim et al. | |
| 2009/0287814 A1 | 11/2009 | Robertson et al. | |
| 2009/0289917 A1* | 11/2009 | Saunders | G06F 3/0482 345/174 |
| 2009/0315740 A1* | 12/2009 | Hildreth et al. | 341/20 |
| 2010/0325166 A1 | 12/2010 | Rubin et al. | |
| 2011/0010668 A1 | 1/2011 | Feldstein et al. | |
| 2011/0055722 A1 | 3/2011 | Ludwig | |
| 2011/0115814 A1 | 5/2011 | Heimendinger et al. | |
| 2011/0141031 A1* | 6/2011 | McCullough | G06F 3/0481 345/173 |
| 2012/0113008 A1* | 5/2012 | Makinen | G06F 3/016 345/168 |
| 2012/0191704 A1 | 7/2012 | Jones | |
| 2012/0324370 A1* | 12/2012 | Martin | 715/752 |
| 2014/0101576 A1* | 4/2014 | Kwak | G06F 3/0482 715/761 |

OTHER PUBLICATIONS

"MicroStrategy Mobile for iPhone® and iPad®", Retrieved at <<http://www.healthcarebisummit.com/documents/MicroStrategy-Mobile-Brochure.pdf >>, Retrieved on Oct. 26, 2012, pp. 20.

Walny, et al., "Understanding Pen and Touch Interaction for Data Exploration on Interactive Whiteboards", Retrieved at <<http://research.microsoft.com/en-us/um/redmond/groups/cue/publications/TVCG2012-SketchInsight.pdf>>, In the proceeding In IEEE Transactions on Visualization and Computer Graphics, posted online Oct. 14, 2012, pp. 10.

"Glimpse Unveiled: Data visualization app brings touch-based business intelligence to the Apple iPad", Retrieved at <<http://www.impathic.com/press.html>>, Feb. 28, 2012, pp. 2.

"Office Action and Search Report Issued in Taiwan Patent Application No. 102137174", Mailed Date: Dec. 6, 2016, 18 Pages.

* cited by examiner

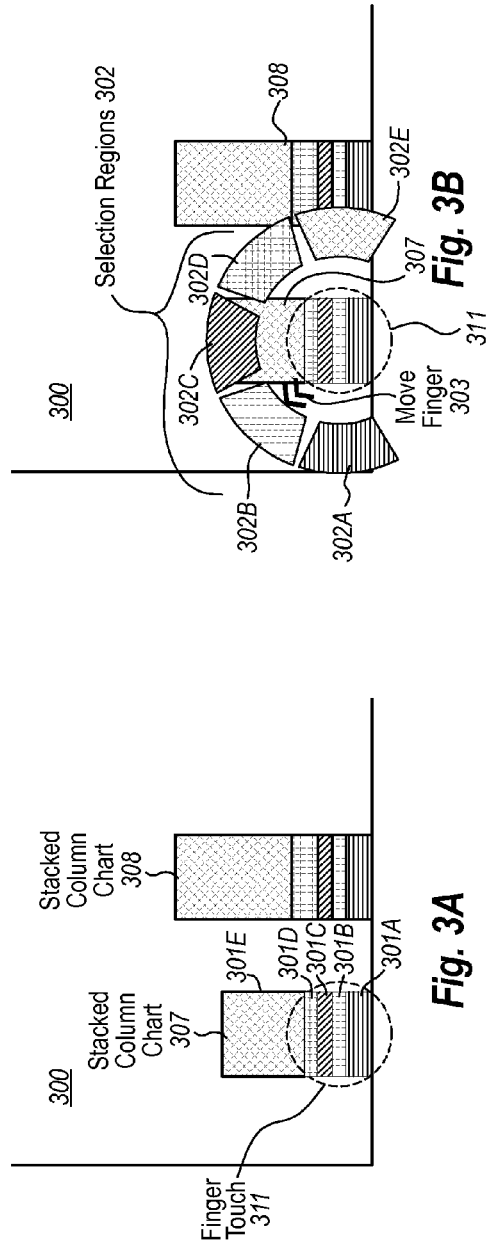
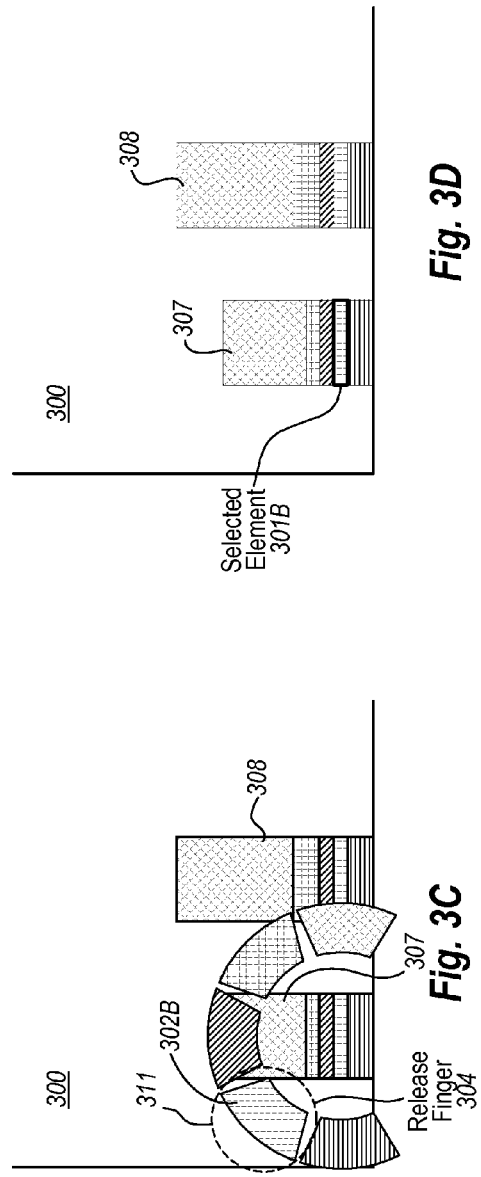
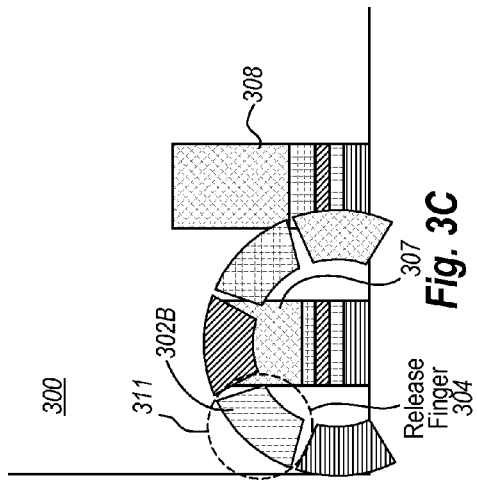

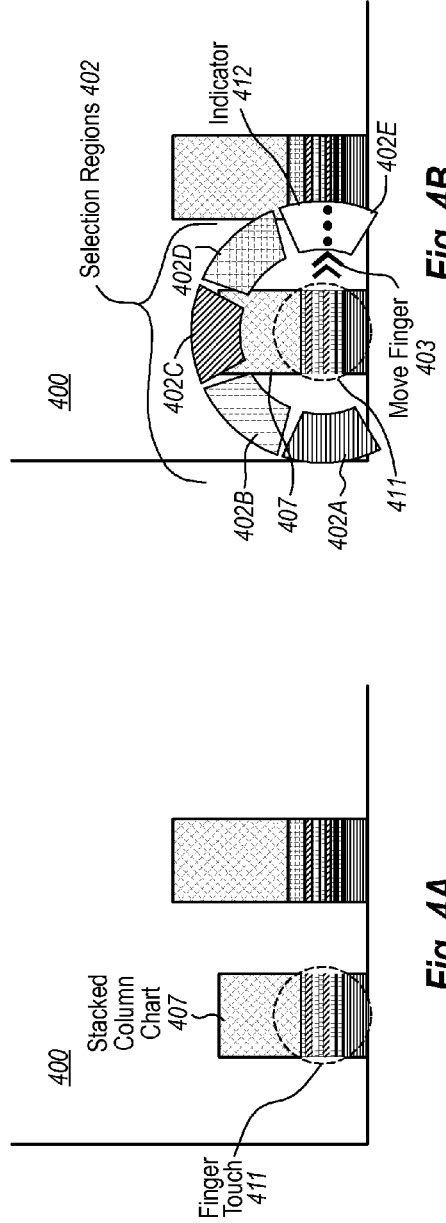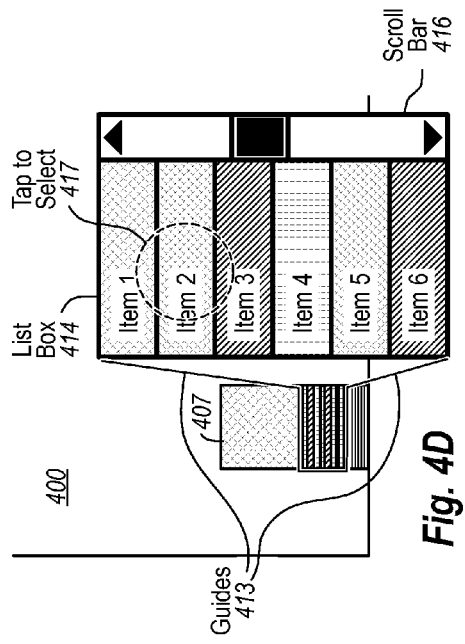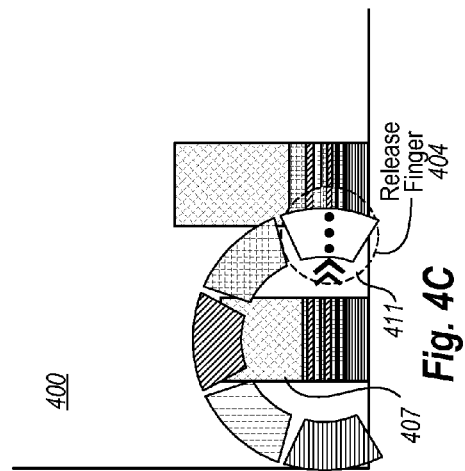

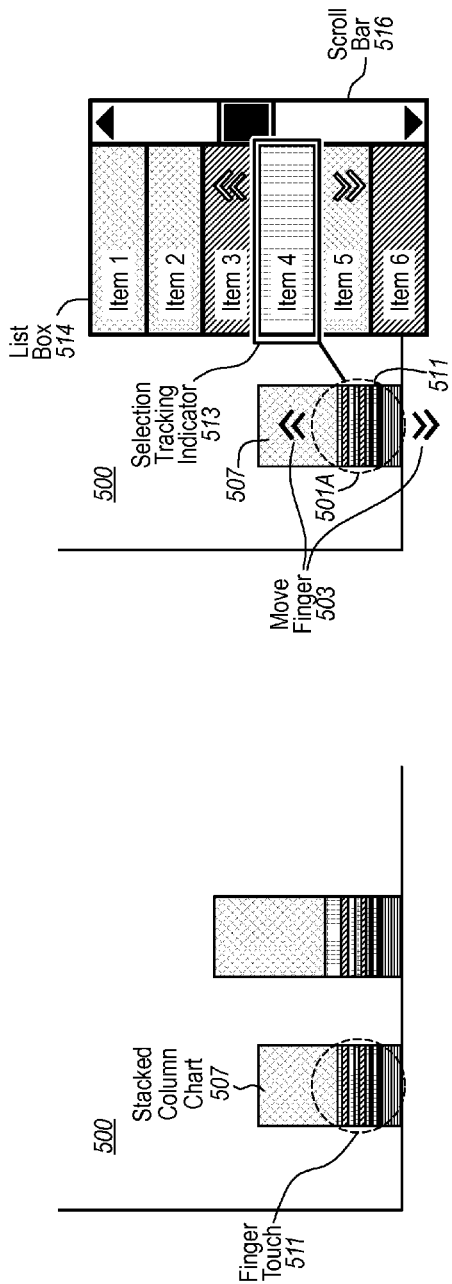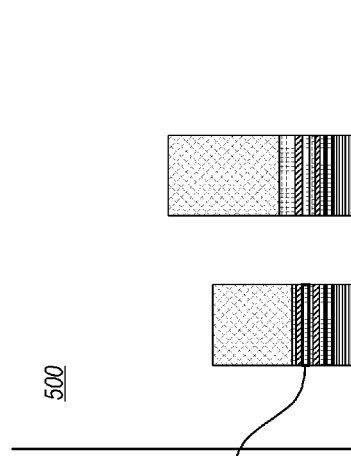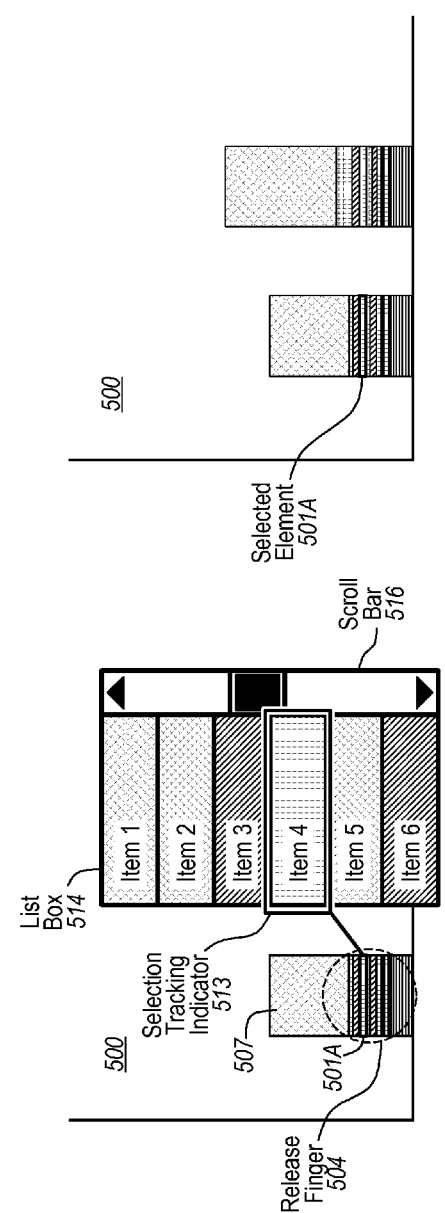

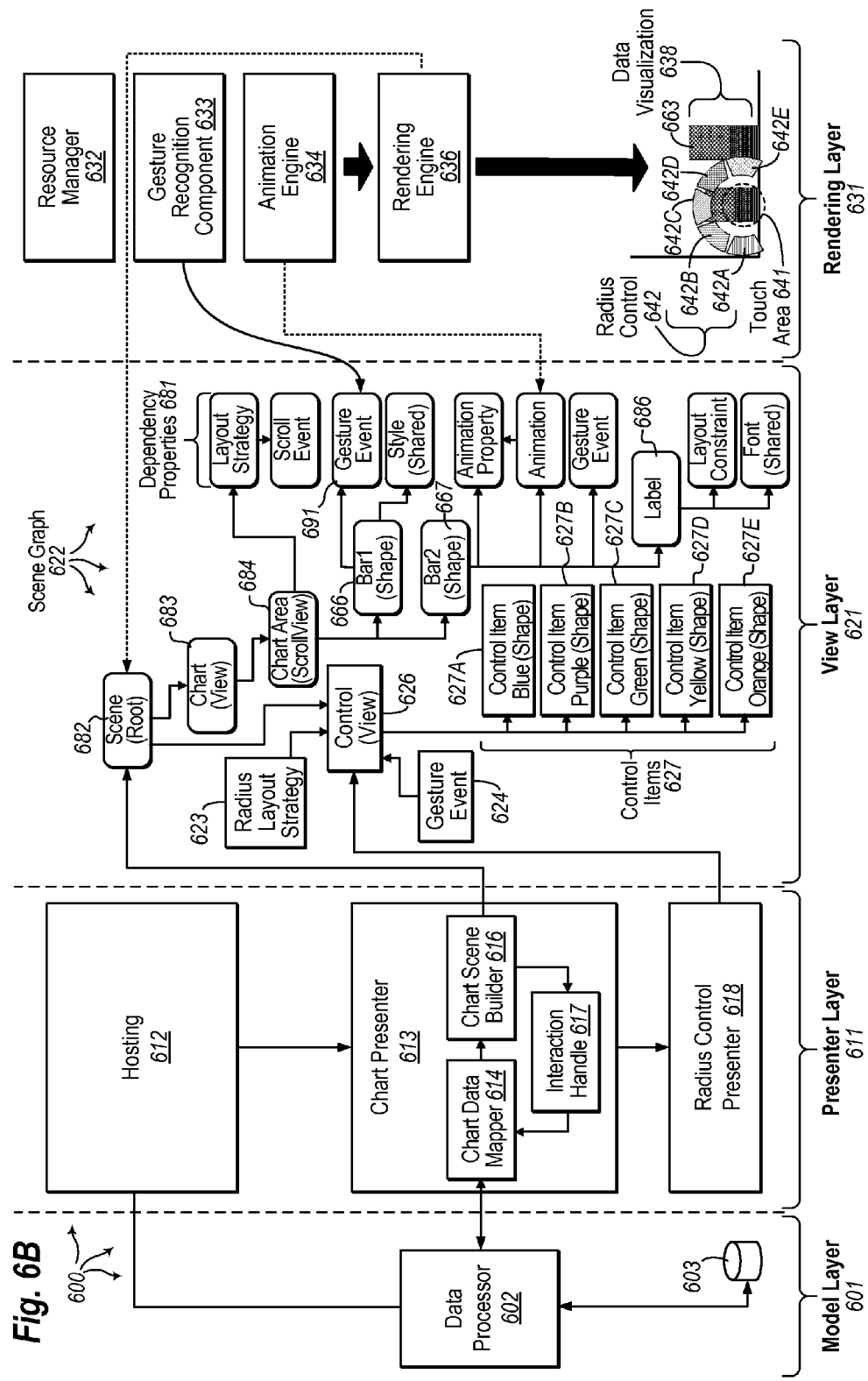

TOUCH BASED SELECTION OF GRAPHICAL ELEMENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

On many computing devices, including mobile computing devices, touch (finger) input is a preferred type of input. However, compared with other types of input, touch input typically results in a larger touch area. For example, the touch area of a fingertip is typically larger than the area of a mouse pointer. This larger touch area can potentially hide or obscure graphical elements, for example, under or below a finger. This larger touch area can also make it difficult to identify a graphical element that is actually being selected. For example, multiple graphical elements may be at least partially within a fingertip touch area. Upon detecting multiple graphical elements at least partially within a fingertip touch area, a computing device may be unable to determine which of the multiple graphical elements a user intends to select. As such, using touch input for selection of or interaction with smaller graphical elements is generally more challenging.

BRIEF SUMMARY

The present invention extends to methods, systems, and computer program products for touch based selection of graphical elements. A computing device presents a data visualization on a touch screen display device of the computing device. The data visualization includes a plurality of graphical elements. Each graphical element represents a portion of data. The computing device detects a touch based selection gesture on the touch screen display device. Detecting the touch based selection gesture includes detecting a finger touch area on the touch screen display device.

The computing device determines that there is ambiguity as to which of the plurality of graphical elements is being selected. The determination includes calculating that the finger touch area covers at least a sub-plurality of the plurality of graphical elements. In response to the determination, the computing device presents a plurality of new corresponding graphical elements on the touch screen display device. The plurality of new corresponding graphical elements is presented in a region of the touch screen display device that is outside the touch area. Each of the plurality of new corresponding graphical elements corresponds to one of the graphical elements in the at least a sub-plurality of graphical elements.

The computing device detects a further touch based selection gesture on the touch screen display device. Detecting the further touch based selection gesture includes detecting a further finger touch area on the touch screen display device. The computing device identifies an unambiguous intent to select one of the new corresponding graphical elements. The determination includes calculating that the further finger touch area primarily covers the one of the new corresponding graphical elements from among the plurality of new corresponding graphical elements.

In response to identifying the unambiguous intent to select one of the new corresponding graphical elements, the computing device selects the corresponding graphical element from within the sub-plurality of graphical elements. Also in response to identifying the unambiguous intent to select one of the new corresponding graphical elements, the computing device performs an activity related to the selected corresponding graphical element.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3D illustrate an example of presenting and selecting graphical elements in a data visualization.

FIGS. 4A-4D illustrate an example of presenting and selecting graphical elements in a data visualization.

FIGS. 5A-5D illustrate an example of presenting and selecting graphical elements in a data visualization.

FIGS. 6A-6D illustrate a computer architecture that facilitates touch based selection of graphical elements.

DETAILED DESCRIPTION

Figure 1A:
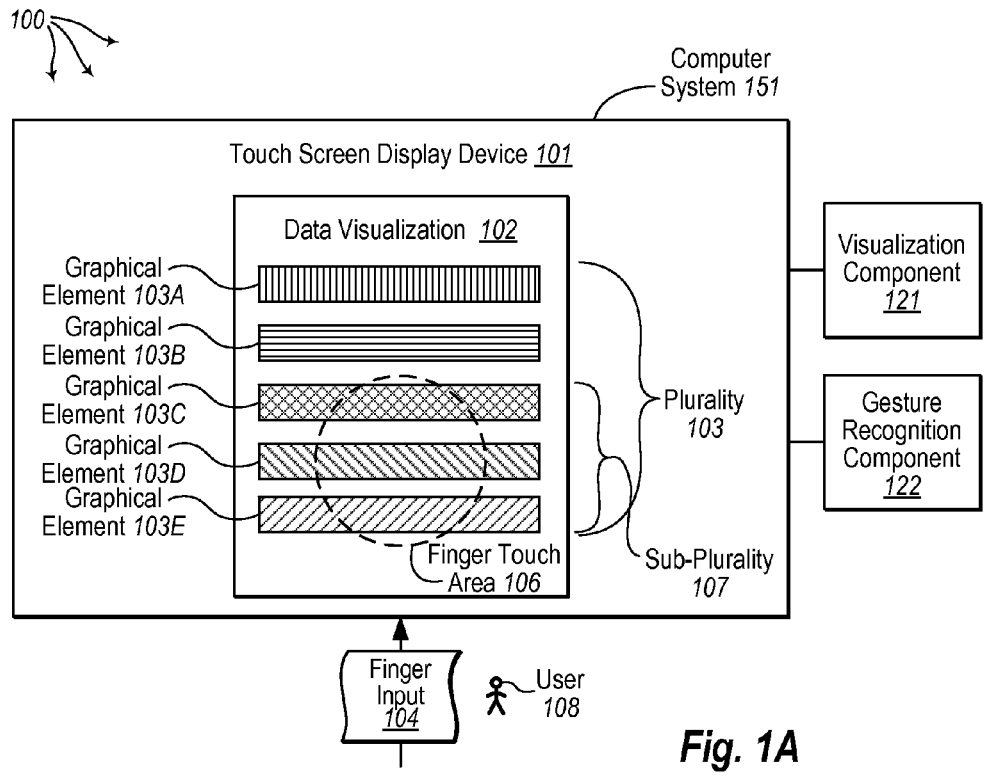
FIGS. 1A-1C illustrates an example computer architecture that facilitates touch based selection of graphical elements.

The present invention extends to methods, systems, and computer program products for touch based selection of graphical elements. A computing device presents a data visualization on a touch screen display device of the computing device. The data visualization includes a plurality of graphical elements. Each graphical element represents a portion of data. The computing device detects a touch based selection gesture on the touch screen display device. Detecting the touch based selection gesture includes detecting a finger touch area on the touch screen display device.

The computing device determines that there is ambiguity as to which of the plurality of graphical elements is being selected. The determination includes calculating that the finger touch area covers at least a sub-plurality of the plurality of graphical elements. In response to the determination, the computing device presents a plurality of new corresponding graphical elements on the touch screen display device. The plurality of new corresponding graphical elements is presented in a region of the touch screen display device that is outside the touch area. Each of the plurality of new corresponding graphical elements corresponds to one of the graphical elements in the at least a sub-plurality of graphical elements.

The computing device detects a further touch based selection gesture on the touch screen display device. Detecting the further touch based selection gesture includes detecting a further finger touch area on the touch screen display device. The computing device identifies an unambiguous intent to select one of the new corresponding graphical elements. The determination includes calculating that the further finger touch area primarily covers the one of the new corresponding graphical elements from among the plurality of new corresponding graphical elements.

In response to identifying the unambiguous intent to select one of the new corresponding graphical elements, the computing device selects the corresponding graphical element from within the sub-plurality of graphical elements. Also in response to identifying the unambiguous intent to select one of the new corresponding graphical elements, the computing device performs an activity related to the selected corresponding graphical element.

Embodiments of the present invention may comprise or utilize a special purpose or general-purpose computer including computer hardware, such as, for example, one or more processors, system memory, and a touch screen display device, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, a "data visualization" is defined as a visual representation of data abstracted in some schematic form. A data visualization can include attributes or variables for the units of information. A data visualization can include any of charts, grids, tiles, small multiples, maps, text, and play axis. A chart can be any of a column chart, a stacked column chart, a clustered column chart, a 100% column chart, a bar chart, a stacked bar chart, a 100% bar chart, a clustered bar chart, a line chart, a scatter chart, a bubble chart, or a pie chart. A grid can be any of a table grid, a matrix grid, a card gird, or a slicer grid. Tiles can be a tab strip or a cover flow.

Embodiments of the invention improve the usability of interacting with data visualizations. A visualization component presents a data visualization on a touch screen display device. When a user touches a portion of the data visualization, his or her finger may cover multiple graphical elements. When multiple graphical elements are covered, a corresponding gesture recognition component detects ambiguity in the selection. In response to the detected ambiguity, the visualization component draws additional regions around the touched location. The additional regions correspond to and can include details of the graphical elements covered by their finger. As such, the user is made aware of the graphical elements that are being covered by his or her finger.

These additional regions are large enough for unambiguous selection with a finger. A user can move his or her finger into one of the additional regions and release to finish the selection. The gesture recognition component interprets this gesture as if a user tapped directly and unambiguously on the corresponding graphical element. In response, the visualization component performs an appropriate action on the corresponding graphical element (e.g. selection, highlighting, sorting, filtering, etc.) in this context.

Figure 1B:
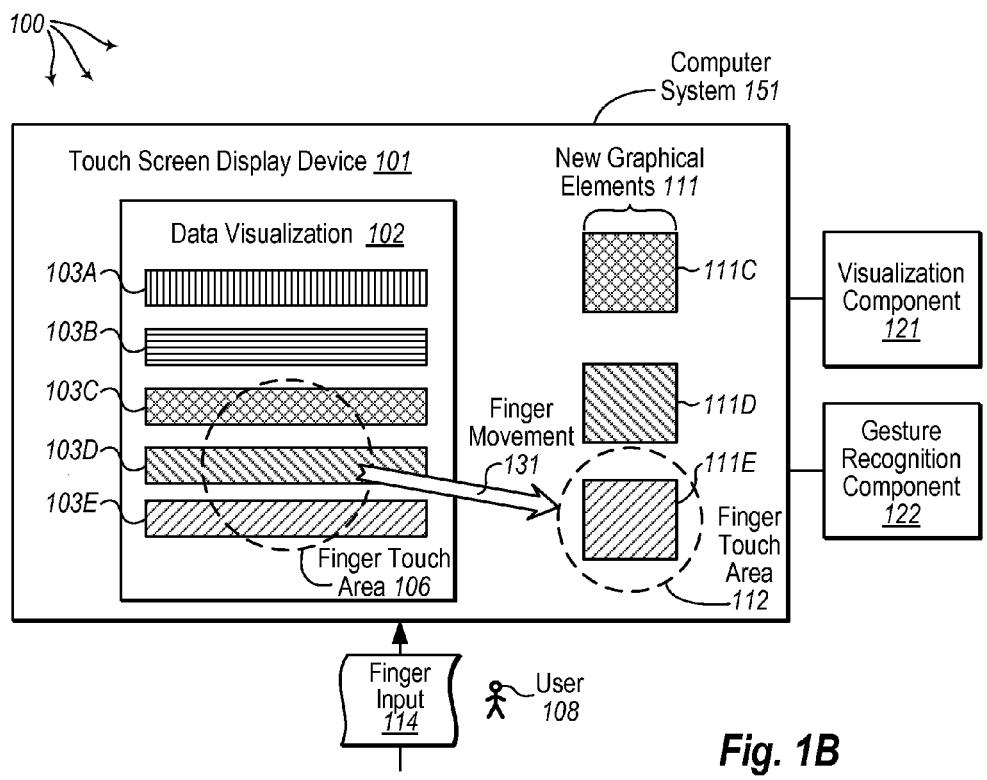
Figure 1C:
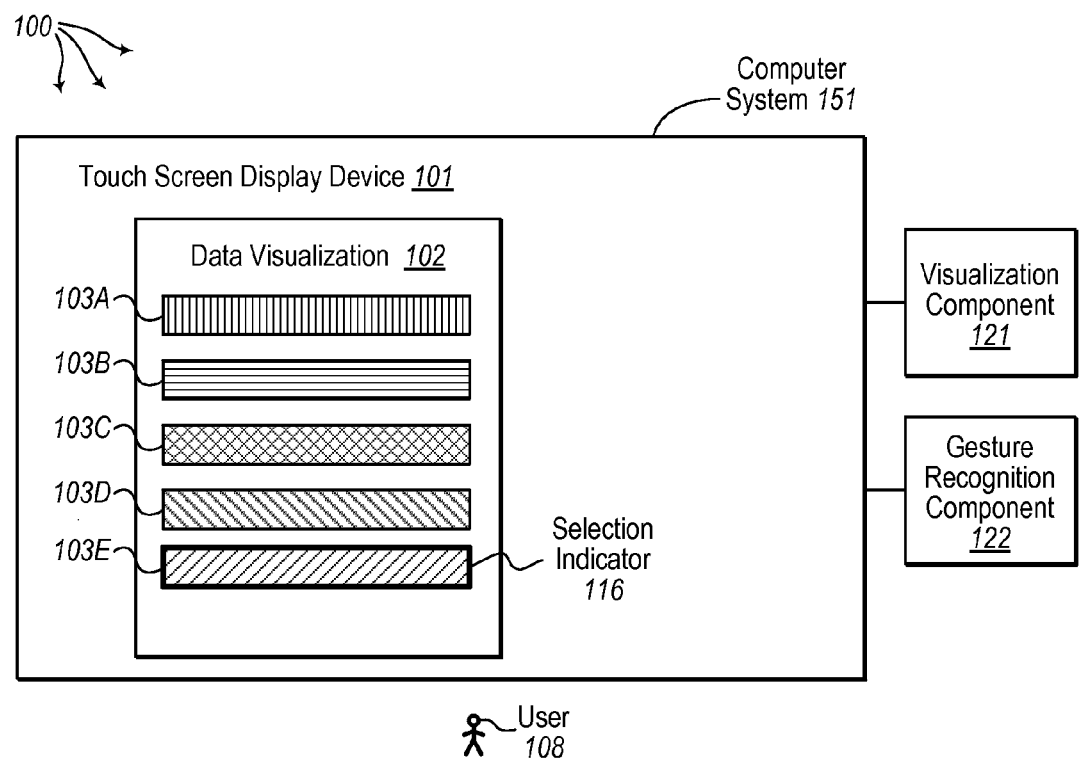

FIGS. 1A-1C illustrates an example computer architecture 100 that facilitates touch based selection of graphical elements. Referring initially to FIG. 1A, computer architecture 100 includes computer system 151. Computer system 151 includes touch screen display device 101, visualization component 121, and gesture recognition component 122. Components of computer system 151, including touch screen display device 101, visualization component 121, and gesture recognition component 122, can be connected to one another over (or be part of) a local bus and/or a network, such as, for example, a Local Area Network ("LAN"), a Wide Area Network ("WAN"), and even the Internet. Accordingly, components of computer system 151, including touch screen display device 101, visualization component 121, and gesture recognition component 122, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the local bus and/or network.

Figure 2:
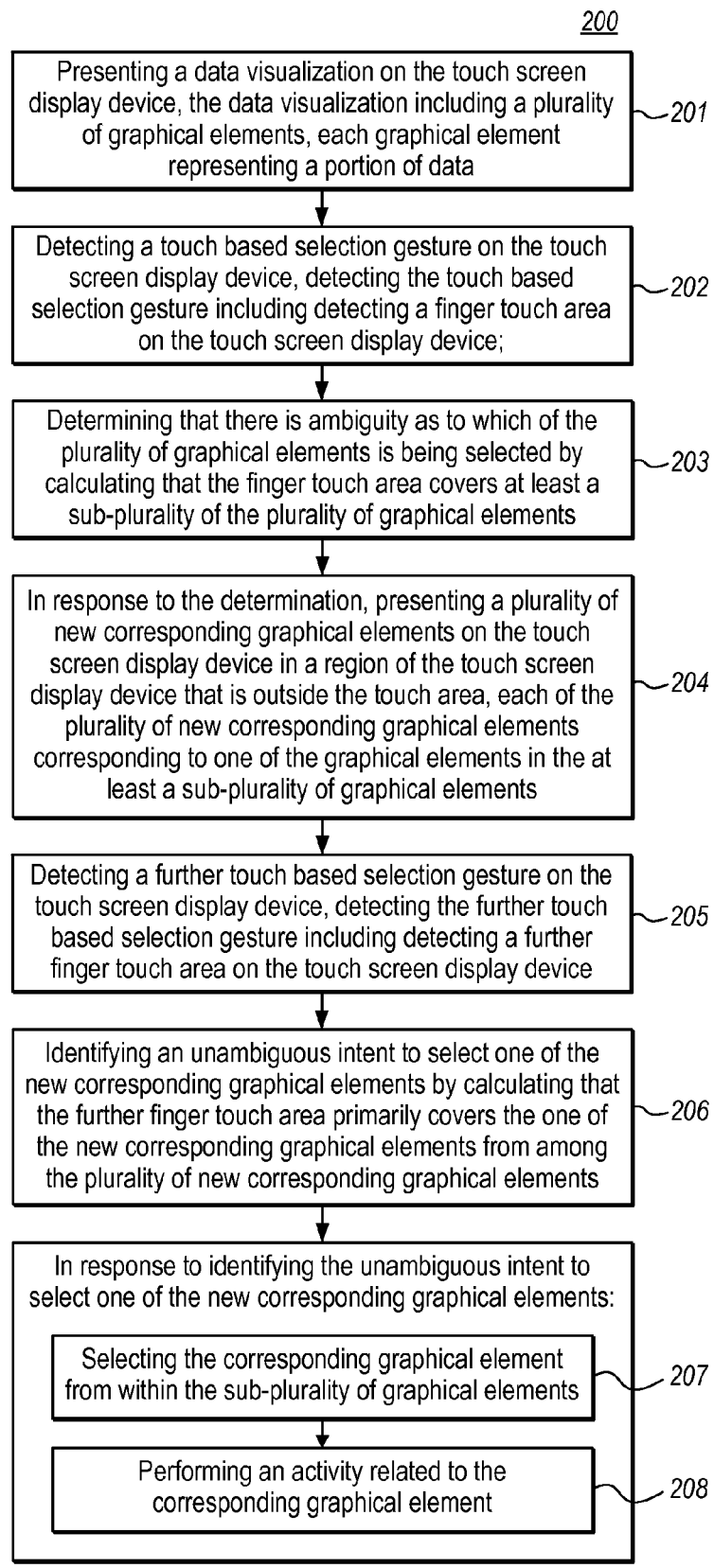
FIG. 2 illustrates a flow chart of an example method for touch based selection of graphical elements.

FIG. 2 illustrates a flow chart of an example method 200 for touch based selection of graphical elements. Method 200 will be described with respect to the components and data of computer architecture 100.

Method 200 includes presenting a data visualization on the touch screen display device, the data visualization including a plurality of graphical elements, each graphical element representing a portion of data (201). For example, still referring to FIG. 1A, visualization component 121 can present data visualization 102 on touch screen display device 101. Data visualization 102 includes a plurality of graphical elements 103, including graphical elements 103A-103E. Each of graphical elements 103A-103E can represent a portion of data (e.g., from a data repository).

User 108 can submit finger input 104 to computer system 151. For example, user 108 can touch touch screen display device 104 in finger touch area 106. As depicted, finger touch area 106 appears as a circle. However, in general, a finger touch area may not be a circle. A finger touch area can vary (and can be non-uniform) in size and shape, depending, for example, on the size of a finger, fingertip geometry, how much force is being used to press against a touch screen display device, touch screen display device material, etc. A detected finger touch area may also be smaller or larger than the actual area on a touch screen display device that is being touched by a finger.

Method 200 includes detecting a touch based selection gesture on the touch screen display device, detecting the touch based selection gesture including detecting a finger touch area on the touch screen display device (202). For example, gesture recognition component 122 can detect a touch based selection gesture on touch screen display device 101. Detecting the touch based selection gesture can include detecting finger touch area 106 on touch screen display device 101.

Method 200 includes determining that there is ambiguity as to which of the plurality of graphical elements is being selected by calculating that the finger touch area covers at least a sub-plurality of the plurality of graphical elements (203). For example, gesture recognition component 122 can determine that there is ambiguity as to which of graphical elements 103A-103E is being selection. The ambiguity can be determined by calculating that finger touch area 106 covers sub-plurality of graphical elements 107, including graphical elements 103C-103E.

Method 200 includes, in response to the determination, presenting a plurality of new corresponding graphical elements on the touch screen display device in a region of the touch screen display device that is outside the touch area, each of the plurality of new corresponding graphical elements corresponding to one of the graphical elements in the at least a sub-plurality of graphical elements (204). For example, turning now to FIG. 1B, in response to determining selection ambiguity within sub-plurality of graphical elements 107, visualization component 121 can present new graphical elements 111 on touch screen display device 101. New graphical elements 111 are presented to the side of data visualization 102. Each of new graphical elements 111 correspond to one of the graphical elements in sub-plurality of graphical elements 107. For example, graphical elements 111C, 111D, and 111E corresponding to graphical elements 103C, 103D, and 103E respectively. New graphical elements 111 are presented in a touch optimized manner to minimize the risk of additional ambiguity when selecting a graphical element.

Subsequent to presentation of new graphical elements 111, user 108 can submit finger input 114 to computer system 151. For example, user 108 can perform finger movement 131 sliding his or her finger on the surface of touch screen display device from finger touch area 106 to finger touch area 112. After sliding to finger touch area 112, user 108 can then remove his or her finger from the surface of touch screen display device 101.

Method 200 includes detecting a further touch based selection gesture on the touch screen display device, detecting the further touch based selection gesture including detecting a further finger touch area on the touch screen display device (205). For example, gesture recognition component 122 can detect a further touch based selection gesture on touch screen display device 101. Detecting the further touch based selection gesture can include detecting finger movement 131 from finger touch area 106 to finger touch area 112 and detecting the finger release from touch screen display device 101.

Method 200 includes identifying an unambiguous intent to select one of the new corresponding graphical elements by calculating that the further finger touch area primarily covers the one of the new corresponding graphical elements from among the plurality of new corresponding graphical elements (206). For example, gesture recognition component 122 can identify an unambiguous intent to select new graphical element 111E. The unambiguous intent to select new graphical element 111E can be identified by calculating the finger touch area 112 primarily covers new graphical element 111E.

In response to identifying the unambiguous intent to select one of the new corresponding graphical elements, method 200 includes selecting the corresponding graphical element from within the sub-plurality of graphical elements (207). For example, in response to detecting the unambiguous intent to select new graphical element 111E, gesture recognition component 122 can select graphical element 103E.

In response to identifying the unambiguous intent to select one of the new corresponding graphical elements, method 200 also includes performing an activity related to the corresponding graphical element (208). For example, turning to FIG. 1C, in response to detecting the unambiguous intent to select new graphical element 111E, visualization component 121 can present selection indicator 116 around graphical element 103E (e.g., highlighting graphical element 103E) to visually indicate that graphical element 103E is selected. In response to detecting the unambiguous intent to select new graphical element 111E, visualization component 121 can also remove new graphical elements 111 from touch screen display device 101.

Other activities can include moving to a different report and passing the selected element as a new context, performing sorting operations, performing filtering operations, etc.

It may be that after new graphical elements are presented none of the new graphical elements are selected. When no new graphical element is selected, a user interface can revert to a previous state. That is, the new graphical elements can disappear.

FIGS. 3A-3D illustrate an example of presenting and selecting graphical elements in a data visualization 300. With respect to data visualization 300, components similar to visualization component 121 and gesture recognition component 122 can facilitate presentation and removal of graphical elements and detecting input gestures respectively.

As depicted in FIG. 3A, data visualization 300 includes stacked column chart 307. Graphical elements 301A-301E of stacked column chart 307 are too small to be individual selected by finger touch 311. A user may attempt to select graphical element 301B. However, a gesture recognition component can determine that the finger covers several graphical elements (graphical elements 301A-301E) at the same time.

Moving to FIG. 3B, to improve the usability of interacting with data visualization 300, a visualization component can draw additional selection regions 302A-302E (i.e., other graphical elements) around finger touch 311. The visualization component can present selection regions 302A-302E in a touch optimized manner to minimize the risk of additional ambiguity when selecting a graphical element. For example, additional selection regions 302A-302E can be larger and have sufficient spacing from one another for unambiguous selection with a finger. The visualization component can also present selection regions 302A-302E around the top of finger touch 311. Presenting selection regions 302A-302E around the top of finger touch 311 minimizes the risk of other portions of a finger obscuring the view selecting regions. For example, based on the orientation of a computing device, portions of a finger other than the portion touching the display device, can obscure the view of display device.

Each selection region 302A-302E corresponds to a graphical element 301A-301E respectively. A user can move finger touch 311 towards the desired one of selection regions 302A-302E.

For example, a user can move 303 finger touch 311 towards selection region 302B. Referring now to FIG. 3C, when finger touch 311 is on selection region 302B, the user can release 304 their finger to complete the selection operation. The gesture recognition component accepts a tap event on selection region 302B and performs a selection of corresponding graphical element 301B. Moving to FIG. 3D, the visualization component can highlight selected element 301B to indicate the selection of element 301B. The visualization component can also fade out other graphical elements (301A, 301C-301E) and areas (stacked column chart 308) and remove selection regions 302A-302E.

FIGS. 4A-4D illustrate an example of presenting and selecting graphical elements in a data visualization 400. With respect to data visualization 400, components similar to visualization component 121 and gesture recognition component 122 can facilitate presentation and removal of graphical elements and detecting input gestures respectively.

As depicted in FIG. 4A, data visualization 400 includes stacked column chart 407. Many graphical elements of stacked column chart 407 are too small to be individual selected by finger touch 411. A user may attempt to select element one of these smaller elements. However, the gesture recognition component can determine that the finger covers several graphical elements at the same time. The gesture recognition component can also determine that the number of selection regions (i.e., other graphical elements) is too great to all be shown around touch area 411.

Moving to FIG. 4B, to improve the usability of interacting with data visualization 400, the visualization component can draw additional selection regions 402A-402E (i.e., other graphical elements) around finger touch 411. The visualization component can present selection regions 402A-402E in a touch optimized manner to minimize the risk of additional ambiguity when selecting a graphical element. For example, additional selection regions 402A-402E can be larger and have sufficient spacing from one another for unambiguous selection with a finger. The visualization component can also present selection regions 402A-402E around the top of finger touch 411. Presenting selection regions 402A-402E around the top of finger touch 411 minimizes the risk of other portions of a finger obscuring the view selecting regions. For example, based on the orientation of a computing device, portions of a finger other than the portion touching the display device, can obscure the view of display device.

Some of the selection regions, for example, selection regions 402A-402D, correspond to a graphical element in stacked column chart 407. However, since the number of selection regions was determined to be too great to all be shown, selection region 402E can be used to access further selection regions. As depicted, the visualization component can present indicator 412 (an ellipsis) inside selection region 402E. Indicator 412 indicates that further selection regions can be accessed by selecting selection region 402E.

A user can move finger touch 411 towards the desired one of selection regions 402A-402E. For example, a user can move 403 finger touch 411 towards selection region 402E. Moving to FIG. 4C, the user can release 404 their finger to complete the selection operation. The gesture recognition component accepts a tap event on selection region 402E.

Turning to FIG. 4D, in response, the visualization component presents list box 414, including scroll bar 416. List box 414 includes additional (or even all) graphical elements that were under finger touch 411. The visualization component can present graphical elements in list box 414 in a touch optimized manner to minimize the risk of additional ambiguity when selecting a graphical element. For example, graphical elements in list box 414 can be of sufficient size for unambiguous selection with a finger.

The user can interact with the list by manipulating scroll bar 416 to scroll up and down (e.g., using a swipe gesture or touching and moving their finger up and down) and tapping a desired element to select (e.g., tap to select 417 to select "Item 2"). The visualization component can present guides 413 to indicate that the items in list box 414 correspond to a specific area of stacked column chart 407 (finger touch 411). After a selection is made, action can be taken on the selected graphical element and the visualization component can remove list box 414.

Alternately, referring back briefly to FIG. 4B, selection regions 402 can act as a carrousel. When the gesture recognition component recognizes a "swipe" to one side or the other, selection regions 402 can correspondingly rotate, exposing new selection regions. Then, similar to FIG. 3C, when a finger touch is on a selection region, the user can release their finger to complete a selection operation. The gesture recognition component accepts a tap event on a selection region and performs a selection of a corresponding graphical element in stacked column chart 407. The visualization component can highlight (or take some other action on, such as, for example, sorting, filtering, etc.) the selected graphical element in stacked column chart 407. The visualization component can also fade out other graphical elements and areas and remove selection regions.

FIGS. 5A-5D illustrate an example of presenting and selecting graphical elements in a data visualization. With respect to data visualization 500, components similar to visualization component 121 and gesture recognition component 122 can facilitate presentation and removal of graphical elements and detecting input gestures respectively.

As depicted in FIG. 5A, data visualization 500 includes stacked column chart 507. Many graphical elements of stacked column chart 507 are too small to be individual selected by finger touch 511. A user may attempt to select element one of these smaller elements. However, the gesture recognition component can determine that the finger covers several graphical elements at the same time.

Moving to FIG. 5B, to improve the usability of interacting with data visualization 500, a visualization component can present list box 514, including scroll bar 516. List box 514 includes graphical elements that are under finger touch 511. The visualization component can present graphical elements in list box 514 in a touch optimized manner to minimize the risk of additional ambiguity when selecting a graphical element. For example, graphical elements in list box 514 can be of sufficient size for unambiguous selection with a finger.

The visualization component can present selection tracking indicator 513 to indicate the current graphical element from stacked column chart 507 that is in focus (and would be selected when the finger is released). A user can move 503 his or her finger up or down on stacked column chart 507 to select different graphical elements. As the finger is moved, selection tracking indicator 513 also moves up and down in the list box to indicate the graphical element that is currently in focus. As depicted in FIG. 5B, selection tracking indicator 513 indicates that graphical element 501A is in focus.

Referring now to FIG. 5C, a user can release 504 his or her finger to complete the selection operation of graphical element 501A. The gesture recognition component accepts a tap event on graphical element 501A (the graphical element currently in focus). The gesture recognition component performs a selection of graphical element 501A. Moving to FIG. 5D, the visualization component can highlight selected element 510A to indicate the selection of element 501A. The visualization component can also fade out other graphical elements in stacked column chart 507 and other areas and remove list box 514.

A visualization component can also use a variety of other techniques to present additional touch optimized graphical elements that are more comfortable to select using a finger relative to originally presented graphical elements.

Figure 6A:
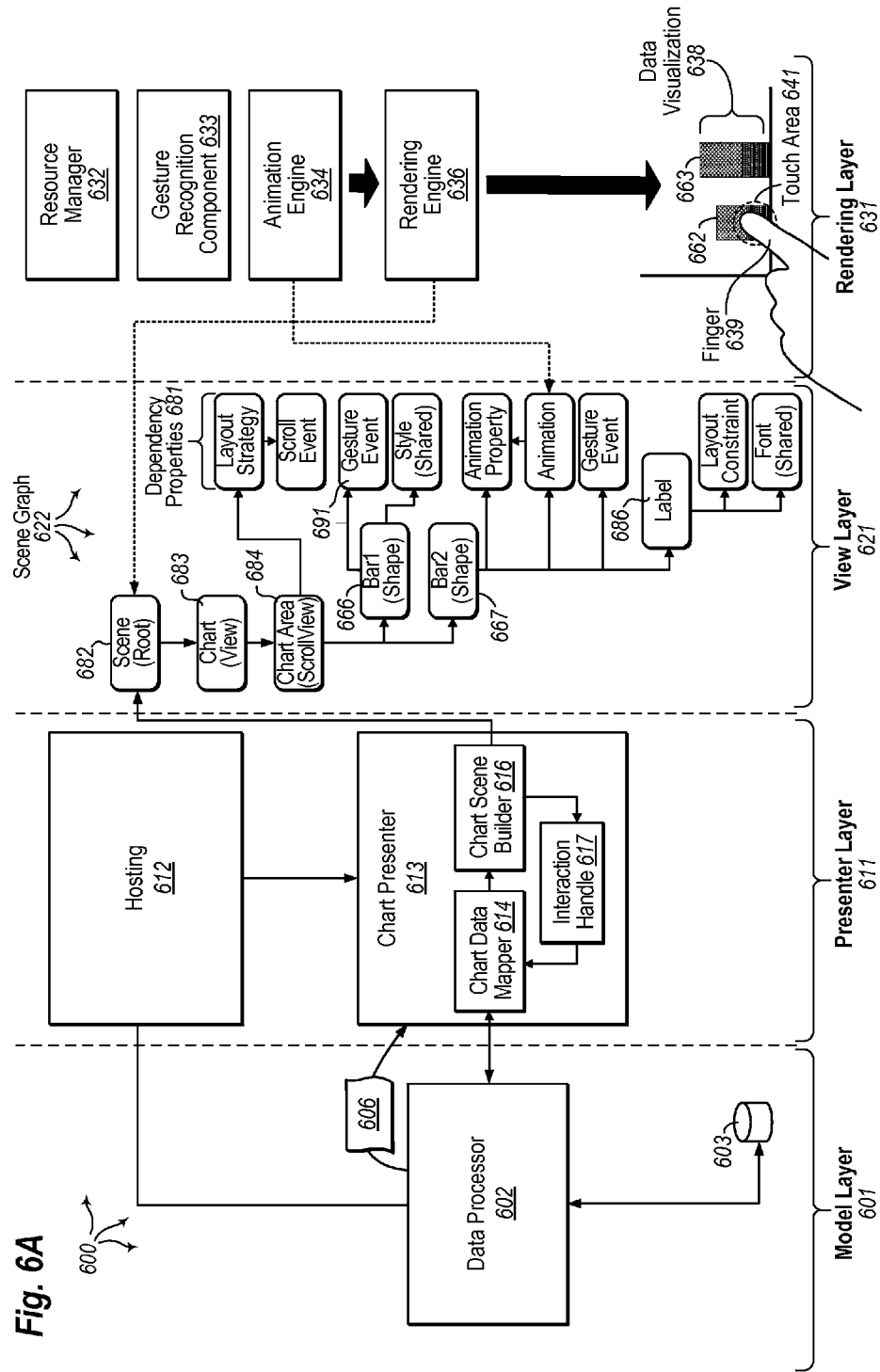

FIGS. 6A-6D illustrate a computer architecture 600 that facilitates touch based selection of graphical elements. Referring to FIG. 6A, computer architecture 600 includes model layer 601, presented layer 611, view layer 621, and rendering layer 631. Components at each of model layer 601, presented layer 611, view layer 621, and rendering layer 631 can be connected to one another over (or be part of) a local bus and/or a network, such as, for example, a Local Area Network ("LAN"), a Wide Area Network ("WAN"), and even the Internet. Accordingly, components at each of model layer 601, presented layer 611, view layer 621, and rendering layer 631 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the local bus and/or network.

As depicted in FIG. 6A, model layer 601 includes data processor 602 and data 603. In general, the data processor 602 can process data 603 to formulate a model defining data to be displayed or otherwise acted upon at a user interface. For example, data processor 602 can formulate chart definition 606 for data visualization 638 that is to be displayed.

Presenter layer 611 includes hosting component 612 and chart presenter 613. Chart presenter 613 includes chart data mapper 614, chart scene builder 616, and interaction handler 617. Chart presenter 613 can access a data definition for a chart (e.g., data visualization 638) as well as data from hosting components 612. Chart data mapper 614, chart scene builder 616, and interaction handler 617 can interoperate to format chart definition 606 into scene graph 622.

View layer 621 includes scene graph 622. Scene graph 622 is an interface that displays data (e.g., from a data definition). Scene graph 622 includes node 682 (the root node), node 683 (corresponding to data visualization 638), node 684 (for scrollview), node 666 (corresponding to stacked column 662), node 667 (corresponding to stacked column 663), and node 686 (corresponding to a label of stacked column 663). Nodes corresponding to other user interface elements in data visualization 638 can also be included in scene graph 622.

Scene graph 622 also includes dependency properties 681 defining behaviors attached to nodes. Attached behaviors can be used to specify how visual elements in the user interface are animated. Stock animations (such as easing functions) can be encapsulated in easy-to-reuse behaviors that can be simply attached to the node to be animated. More complex animations can be represented using configurable behaviors specifying the parameters of the animation and/or the target property of the node to be animated. Attached behaviors can also be used to specify the styling behavior of nodes in a scene graph so that the propagation of style information to child nodes (colors, fonts, opacity, visual effects, etc.) can be controlled.

Attached behaviors can encapsulate programmatic logic (such as layout logic described above) or can encapsulate information (meta-data) that can be used by user interface sub-systems (e.g., rendering sub-systems) to implement the specific behavior described. As such, attached behaviors represent a way to extend the scene graph approach so that it can be used to represent highly interactive user interfaces. Attached behaviors can define the interactive nature of a user interface.

Attached behaviors can be used to specify how user input gestures (touch, mouse, keyboard, voice, etc.) are to be handled. Behaviors that represent specific gestures (such as tap, swipe, click) can be attached to a node in a scene graph and configured to invoke a certain command or action in the application. When a gesture recognizer detects a user gesture, it routes input gesture data to the nearest scene graph for which a suitable gesture behavior is attached. The associated command or action is then automatically invoked. Gesture behaviors for different touch gestures can be attached to nodes throughout a scene graph hierarchy to implement more complex gesture handling scenarios.

Rendering layer 631 includes resource manager 632, gesture recognition component 633, animation engine 634, and rendering engine 636. Resource manager 632 is configured to manage the resources consumed to data visualization 638. Animation engine 634 is configured to implement animation logic. Rendering engine 636 implements rendering. For example, rendering engine 636 can render data visualization 138, including stacked column charts 662 and 663, on a display device.

As depicted, finger 639 touches a touch screen display device in touch area 641. Gesture recognition component 633 can detect the touch at touch area 641. Gesture recognition component 633 can determine ambiguity associated with selecting a graphical element from stacked column chart 662. Gesture recognizer 633 issues an event on rendering layer 631. The event gets synthesized in view layer 621 by gesture event 691. Node 666 gets notified, which is turn notifies chart presenter 613.

Turning to FIG. 6B, in response, chart presenter 613 invokes radius control presenter 618 in presenter layer 611. Radius control presenter 618 adds nodes control 626, radius layout strategy 623, gesture event 624, and control items 627, including control items 627A-627E to scene graph 622. Rendering engine 636 can render scene graph 622 to present radius control 642 in data visualization 638. Each of control items 627A-627E corresponds to each of selection regions 642A-642E respectively.

Figure 6C:
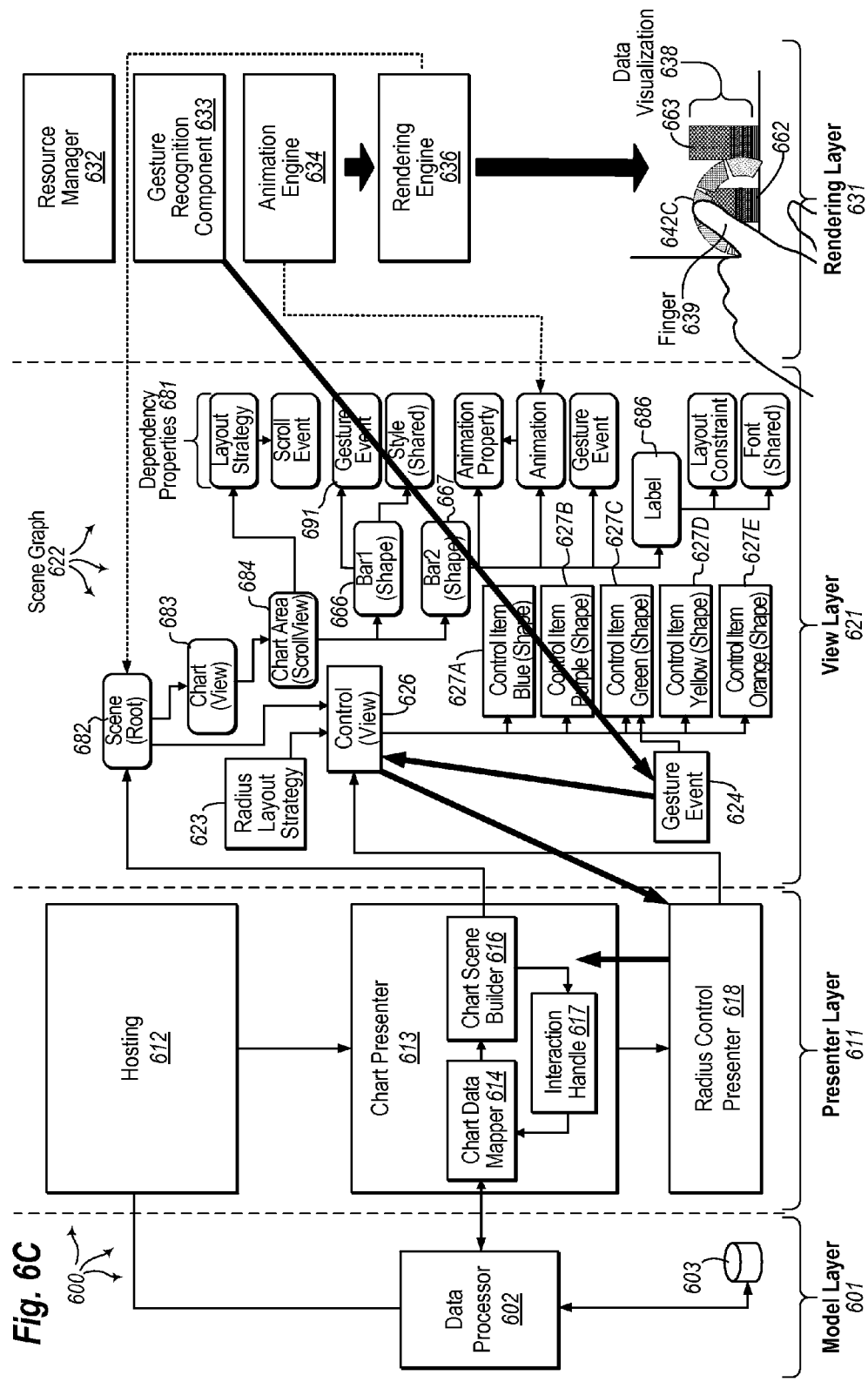

Turning to FIG. 6C, gesture recognition component 633 subsequently detects finger 639 touch selection region 642C. Gesture recognizer 633 issues an event on rendering layer 631. The event gets synthesized in view layer 621 by gesture event 624. Node 626 gets notified, which is turn notifies radius control presenter 618. Chart presenter 613 issues a command to select the corresponding graphical element in stacked column chart 662.

Figure 6D:
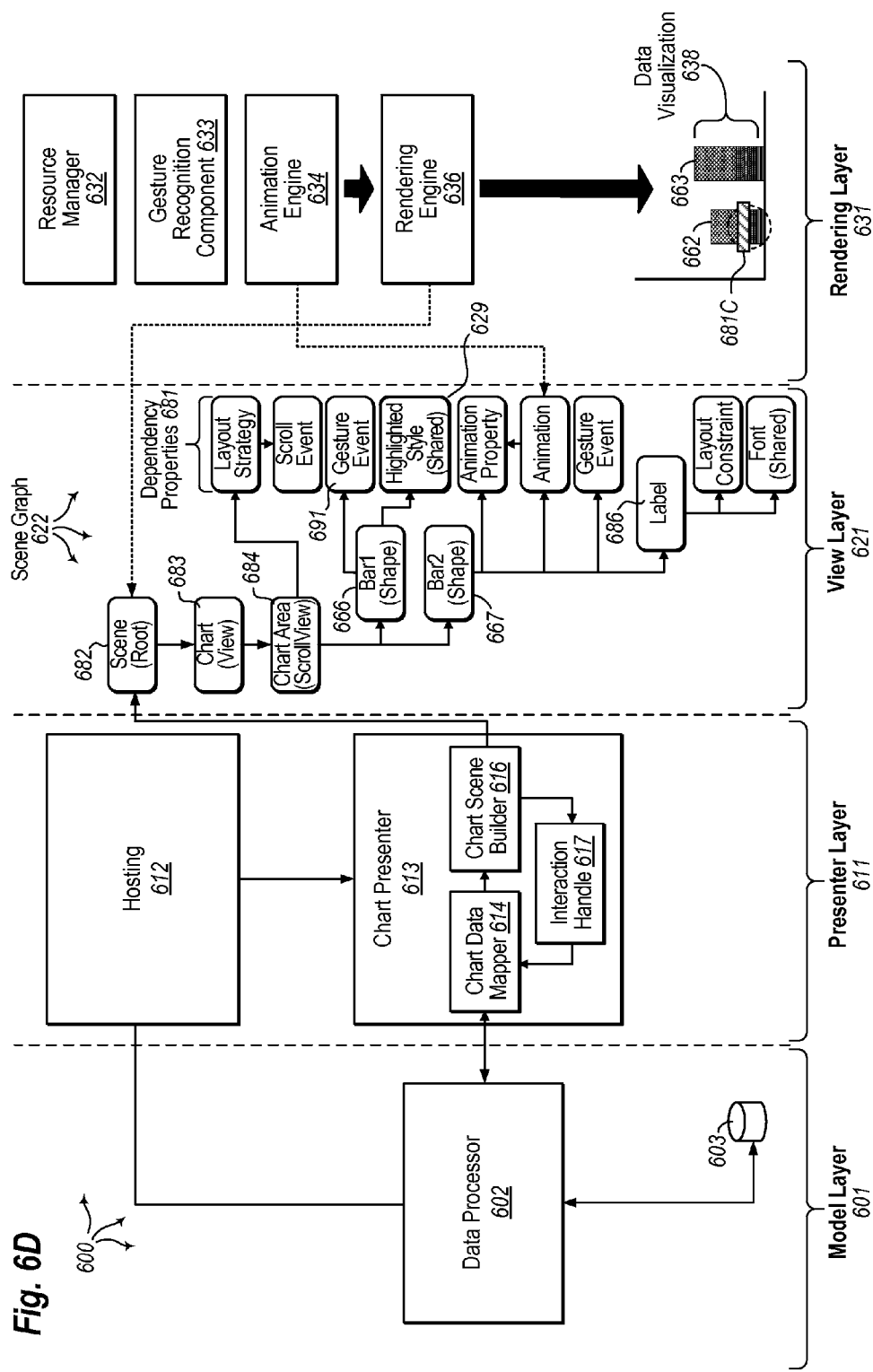

Turning to FIG. 6D, radius control presented is removed, which also removes associated nodes from scene graph 622. The command issued from chart presenter 613 updates the style used by the scene node (node 629) to represent the highlight graphical element. Rendering engine can render the updated style to highlight graphical element 681C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computing device, the computing device including a touch screen display device, a method for selecting a graphical element, the method comprising:

rendering part of a scene graph into a data visualization on the touch screen display device, the data visualization presenting an arrangement of a plurality of graphical elements, each graphical element having a first specified shape and representing a portion of data, the arrangement formatted based at least on a first format defined in the scene graph, the first format defining that each graphical element in the arrangement be presented having the first specified shape;

calculating that a finger touch area on the touch screen display device covers at least a sub-plurality of the plurality of graphical elements, the calculation indicative of ambiguity as to which of the plurality of graphical elements is being selected;

rendering another part of the scene graph to supplement the data visualization by presenting a semi-circular arrangement of a plurality of new graphical elements on the touch screen display device around the touch area, each new graphical element presented with a uniform size, each new graphical element in the semi-circular arrangement corresponding to a graphical element in the at least a sub-plurality of graphical elements and having a second specified shape, the uniform size defined in a second format defined in the scene graph, the second format defining that each new graphical element in the semi-circular arrangement be presented having the second specified shape, the second specified shape differing from the first specified shape, the semi-circular arrangement including a further new graphical element linking to additional graphical elements from within the sub-plurality of graphical elements, the further new graphical element visually indicating the linkage to the additional graphical elements from within the sub-plurality of graphical elements; and detecting a further touch based selection gesture on the touch screen display device, the further touch based selection gesture indicating an unambiguous intent to perform a data activity associated with a graphical element by detecting that a further finger touch area primarily covers the new graphical element corresponding to the graphical element, the data activity related to a portion of data represented by the graphical element.

2. The method of claim 1, wherein rendering part of a scene graph comprises presenting a first graphical element of a first size and a second graphical element of a second different size, the first size and the second different size derived from the first format, the first graphical element and the second graphical element included in the at least a sub-plurality of graphical elements, the first size and the second size based at least in part on underlying data values represented by the first graphical element and the second graphical element respectively.

3. The method of claim 1, wherein detecting a further touch based selection gesture on the touch screen display comprises detecting a finger touch selecting one of the new graphical elements.

4. The method of claim 1, wherein detecting a further touch based selection gesture on the touch screen display device comprises detecting selection of the further new graphical element; and further comprising:

referring again to the scene graphic to render a further part of the scene graph in a list box arrangement of even further new graphical elements, the even further new graphical elements corresponding to other of the sub-plurality of graphical elements.

5. The method claim 1, further comprising detecting a swipe gesture on the semi-circular arrangement of the new group of graphical elements; and in response to the swipe gesture, rotating the semi-circular arrangement of the new group of graphical elements to expose other new graphical elements.

6. The method of claim 1, wherein rendering another part of the scene graph comprises supplementing the data visualization with presentation of a list box arrangement to a side of the finger touch area.

7. The method claim 6, wherein detecting a further touch based selection gesture on the touch screen display device comprises detecting a finger touch selecting a new graphical element from the list box arrangement.

8. The method of claim 1, wherein rendering part of a scene graph into a data visualization on the touch screen display device comprises rendering a data visualization selected from among: a grid, one or more tiles, small multiples, a map, text, and a play axis.

9. The method of claim 1, wherein rendering another part of the scene graph comprises rendering a new corresponding graphical element of a size large enough for unambiguous selection by a finger.

10. The method of claim 1, further comprising, in response to detecting the further touch based selection gesture on the touch screen display device, removing the supplemental arrangement from the touch screen display device.

11. The method of claim 1, further comprising inferring that the finger is also obscuring the view of another portion of the touch screen display device outside of the touch area based on the orientation of the touch screen display device; and wherein rendering another part of the scene graph comprises rendering the supplemental arrangement on the touch screen display device in a region of the touch screen display device that is both outside the touch area and outside the inferred obscured portion of the touch screen display device.

12. The method of claim 1, further comprising:

presenting a visual cue indicating the correspondence between the one of the new graphic elements and the corresponding graphical element in the sub-plurality of graphical elements, the visual cue presented on the touch screen display device.

13. A computer program product for use at computing device, the computing device including a touch screen display device, the computer program product for implementing a method for selecting a graphical element, the computer program product comprising one or more hardware computer storage memories having stored thereon computer-executable instructions that, when executed at a processor, cause the computing device to perform the method, including the following:

render part of a scene graph into a data visualization on the touch screen display device, the data visualization presenting an arrangement of a plurality of graphical elements, each graphical element having a first specified shape and representing a portion of data, the arrangement formatted based at least on a first format defined in the scene graph, the first format defining that each graphical element in the arrangement be presented having the first specified shape;

calculate that a finger touch area on the touch screen display device covers at least a sub-plurality of the plurality of graphical elements, the calculation indicative of ambiguity as to which of the plurality of graphical elements is being selected;

render another part of the scene graph to supplement the data visualization by presenting a semi-circular arrangement of a plurality of new graphical elements on the touch screen display device around the touch area, each new graphical element presented with a uniform size, each new graphical element in the semi-circular arrangement corresponding to a graphical element in the at least a sub-plurality of graphical elements and having a second specified shape, the uniform size defined in a second format defined in the scene graph, the second format defining that each new graphical element in the semi-circular arrangement be presented having the second specified shape, the second specified shape differing from the first specified shape, the semi-circular arrangement including a further new graphical element linking to additional graphical elements from within the sub-plurality of graphical elements, the further new graphical element visually indicating the linkage to the additional graphical elements from within the sub-plurality of graphical elements; and detect a further touch based selection gesture on the touch screen display device, the further touch based selection gesture indicating an unambiguous intent to perform a data activity associated with a graphical element by detecting that a further finger touch area primarily covers the new graphical element corresponding to the graphical element, the data activity related to a portion of data represented by the graphical element.

14. A system, the system comprising:
a hardware processor;
system memory coupled to the hardware processor, the system memory storing instructions that are executable by the hardware processor;
a touch screen display device; and
the hardware processor configured to execute the instructions stored in the system memory to select a graphical element from the touch screen display device, including the following:
render part of a scene graph into a data visualization on the touch screen display device, the data visualization presenting an arrangement of a plurality of graphical elements, each graphical element having a first specified shape and representing a portion of data, the arrangement formatted based at least on a first format defined in the scene graph, the first format defining that each graphical element in the arrangement be presented having the first specified shape;
calculate that a finger touch area on the touch screen display device covers at least a sub-plurality of the plurality of graphical elements, the calculation indicative of ambiguity as to which of the plurality of graphical elements is being selected;
render another part of the scene graph to supplement the data visualization by presenting a semi-circular arrangement of a plurality of new graphical elements on the touch screen display device around the touch area, each new graphical element presented with a uniform size, each new graphical element in the semi-circular arrangement corresponding to a graphical element in the at least a sub-plurality of graphical elements and having a second specified shape, the uniform size defined in a second format defined in the scene graph, the second format defining that each new graphical element in the semi-circular arrangement be presented having the second specified shape, the second specified shape differing from the first specified shape, the semi-circular arrangement including a further new graphical element linking to additional graphical elements from within the sub-plurality of graphical elements, the further new graphical element visually indicating the linkage to the additional graphical elements from within the sub-plurality of graphical elements; and
detect a further touch based selection gesture on the touch screen display device, the further touch based selection gesture indicating an unambiguous intent to perform a data activity associated with a graphical element by detecting that a further finger touch area primarily covers the new graphical element corresponding to the graphical element, the data activity related to a portion of data represented by the graphical element.

15. The system of claim 14, wherein the processor configured to execute the instructions to render another part of the scene graph to supplement the data visualization comprises the processor configured to execute the instructions to render a touch optimized group of new graphical elements to assist with selection of one of the plurality of graphical elements.

16. The system of claim 14, wherein the processor configured to execute the instructions to render another part of the scene graph to supplement the data visualization comprises the processor configured to execute the instructions to render a radius control in accordance with control items defined in the scene graph.

17. The system of claim 14, wherein the processor configured to execute the instructions to render another part of the scene graph to supplement the data visualization comprises the processor configured to execute the instructions to render a list box.

18. The system of claim 14, wherein the processor configured to execute the instructions to render part of a scene graph into a data visualization on the touch screen display device comprises the processor configured to execute the instructions to present a first graphical element of a first size and a second graphical element of a second different size, the first size and the second different size derived from the first format, the first graphical element and the second graphical element included in the at least a sub-plurality of graphical elements.

* * * * *